(12) United States Patent
Komatsu

(10) Patent No.: US 8,222,835 B2
(45) Date of Patent: Jul. 17, 2012

(54) ELECTRONIC BALLAST WITH ADJUSTABLE FILAMENT PREHEATING BASED ON OUTPUT CURRENT SYMMETRY

(75) Inventor: Naoki Komatsu, Kobe (JP)

(73) Assignee: Panasonic Corporation, Osaka (JP)

( * ) Notice: Subject to any disclaimer, the term of this patent is extended or adjusted under 35 U.S.C. 154(b) by 337 days.

(21) Appl. No.: 12/605,452

(22) Filed: Oct. 26, 2009

(65) Prior Publication Data

US 2010/0109533 A1    May 6, 2010

(30) Foreign Application Priority Data

Oct. 28, 2008  (JP) .................................. 2008-277399

(51) Int. Cl.
*H05B 37/02*  (2006.01)
(52) U.S. Cl. ...................... 315/307; 315/209 R; 315/291
(58) Field of Classification Search ................... 315/119, 315/246, 224, 291, 209 R, 244, 227, 307, 315/308, DIG. 5
See application file for complete search history.

(56) References Cited

U.S. PATENT DOCUMENTS

| | | | | |
|---|---|---|---|---|
| 5,583,402 | A * | 12/1996 | Moisin et al. | 315/307 |
| 5,770,926 | A * | 6/1998 | Choi et al. | 315/307 |
| 6,140,771 | A * | 10/2000 | Luger et al. | 315/101 |
| 6,232,728 | B1 * | 5/2001 | Yamamoto et al. | 315/307 |
| 6,518,712 | B2 * | 2/2003 | Weng | 315/209 R |
| 6,965,204 | B2 * | 11/2005 | Langeslag | 315/209 R |
| 2006/0017405 | A1 * | 1/2006 | Breuer et al. | 315/307 |
| 2006/0214607 | A1 * | 9/2006 | Blake | 315/380 |

FOREIGN PATENT DOCUMENTS

WO    03039206    5/2003

* cited by examiner

*Primary Examiner* — Douglas W Owens
*Assistant Examiner* — Amy Yang
(74) *Attorney, Agent, or Firm* — Waddey & Patterson, P.C.; Mark J. Patterson; Gary L. Montle

(57) ABSTRACT

An electronic ballast is provided for adjustable filament preheating of a discharge lamp based on output current symmetry. A power converter receives DC power and outputs AC power. A starting circuit generates a high voltage for starting the lamp. A control circuit controls the AC power output from the power converting circuit. A symmetry determining circuit determines a positive-negative symmetrical state of the AC power output to the lamp with respect to ground. After lamp startup, the control circuit enters a filament heating operation in which the output frequency of the power converting circuit is controlled to a first frequency. At one or more predetermined current detection points during the filament heating operation, the control circuit checks the symmetry state. If the output current is symmetrical at the current detection point, the control circuit ends the frequency heating operation and enters steady state operation with an output frequency of the power converter controlled to a second frequency for maintaining lamp lighting. If the output current is asymmetrical at the current detection point, the control circuit increases the output current to the lamp and continues the frequency heating operation.

13 Claims, 12 Drawing Sheets

ELECTRONIC BALLAST WITH ADJUSTABLE FILAMENT PREHEATING BASED ON OUTPUT CURRENT SYMMETRY

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2008-277399, filed Oct. 28, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to an electronic ballast for powering a discharge lamp and a lighting fixture. More particularly, the present invention relates to an electronic ballast with adjustable filament preheating based on output current symmetry.

An electronic ballast as known in the art for lighting a hot-cathode type discharge lamp, such as a high-pressure discharge lamp also referred to as an HID (High-intensity discharge lamp), typically includes a power converting circuit for receiving a DC input and outputting AC power, and a control circuit for controlling the power converting circuit.

In one example of an electronic ballast as previously known in the art, the control circuit performs a filament heating operation by making an output frequency of the power converting circuit relatively higher to heat each filament of the discharge lamp upon lamp startup This heating operation takes place after a starting operation, during which an output voltage of the power converting circuit is relatively higher, and before the start of steady-state lamp operation.

The electronic ballast of this example can stabilize lamp discharge after a shift to steady-state operation and suppress lamp fade-out as compared to the case where filament heating is not performed.

Referring to FIG. 19(a), a starting period P1 is shown during which a lamp starting operation is performed. When a subsequent filament heating period P2 during which a filament heating operation is performed is relatively short as shown, a filament of the discharge lamp is not sufficiently heated before the start of a steady-state operation period P3 during which a steady-state operation is performed. This results in a current being output to the discharge lamp I_lamp (hereinafter referred to as "lamp current") becoming asymmetrical between polarities. When the filament heating operation shifts to the steady-state operation where the filament of the discharge lamp is not sufficiently heated, as described above, lamp discharge becomes unstable after a shift to the steady-state operation, thereby possibly causing fade-out. Accordingly, it is necessary to set the filament heating period P2 to be sufficiently long as shown in FIG. 19(b). The necessary length of the filament heating period P2 (duration of the filament heating operation) varies for each discharge lamp.

However, where multiple discharge lamps may be connected to the ballast, a particular duration of the filament heating operation that accommodates all discharge lamps is likely to be excessive for most of these discharge lamps. Because the filament heating operation allows the power converting circuit to output larger power than the steady-state operation, in order to suppress a negative effect on the life of the discharge lamp the duration of the filament heating operation needs to be reduced as much as possible while yet properly heating the filaments.

A small lamp current also requires extension of the filament heating period P2 (i.e. a duration time of the filament heating operation).

BRIEF SUMMARY OF THE INVENTION

The present invention was made in consideration of the above problems, with an object to provide an electronic ballast and a lighting fixture in which the amount of power supplied to a discharge lamp during filament heating can be appropriately adjusted for each discharge lamp while causing the duration of the filament heating operation to be relatively short.

According to an aspect of the present invention, a ballast includes a power converting circuit for receiving DC power and outputting AC power, a starting circuit connected between output ends of the power converting circuit together with a discharge lamp so as to generate a high voltage for starting the discharge lamp, and a control circuit for controlling the power converting circuit. The control circuit performs a filament heating operation by making an output frequency of the power converting circuit relatively high to heat each filament of the discharge lamp at lamp startup. This heating operation takes place after a starting operation wherein an output voltage of the power converting circuit is relatively higher, and before the start of lamp steady-state operation.

The ballast includes a symmetry determining circuit for determining whether or not an output current to the discharge lamp is in a positive-negative symmetrical state. The control circuit refers to a determination result by the symmetry determining circuit at current detection points corresponding with predetermined time intervals during the filament heating operation, and shifts the operation to steady state operation when the symmetry determining circuit determines that the output current is in a positive-negative symmetrical state at a current detection point. The control circuit further increases an output current to the discharge lamp to be larger than that at least in starting the filament heating operation when the symmetry determining circuit determines that the output current is in the positive-negative asymmetrical state.

The process shifts to steady state operation when the symmetry determining circuit determines that the output current is in a positive-negative symmetrical state at a current detection point during the filament heating operation, whereby the amount of power supplied to the discharge lamp during the filament heating operation can be appropriately adjusted for each discharge lamp, in comparison with the case in which a duration time of the filament heating operation is fixed. Moreover, the output current to the discharge lamp is increased to be larger than that at least in starting the filament heating operation when the symmetry determining circuit determines that the output current is in the positive-negative asymmetrical state at a current detection point, whereby a duration time of the filament heating operation can be shortened in comparison with the case of not increasing the output current to the discharge lamp.

According to another aspect of the present invention, the power converting circuit includes a step-down chopper circuit for stepping down the received DC power and a full bridge circuit for converting the DC output power of the step-down chopper circuit. Alternatively, the power converting circuit may include a full bridge circuit, and the control circuit controls output power from the power converting circuit by a duty ratio obtained in turning on/off a switching element constituting the full bridge circuit. Alternatively, the power converting circuit may include a half bridge circuit, and the control circuit controls output power of the power converting circuit by a duty ratio obtained in turning on/off a switching element constituting the half bridge circuit.

According to another aspect of the present invention, the control circuit increases output current to the discharge lamp when the symmetry determining circuit determines that the output current is in a positive-negative asymmetrical state at first current detection point, and, after that, sets an output current to the discharge lamp constant until the filament heating operation is finished.

Alternatively, the control circuit may adjust an increase in the output current to the discharge lamp resulting from the determination of the symmetry determining circuit that the output current is in the positive-negative asymmetrical state in accordance with a difference of peak values between polarities of the output current of the power converting circuit at the first current detection point.

According to another aspect of the present invention, in the case where the symmetry determining circuit determines that the output current is in the positive-negative asymmetrical state at the current detection point, the output current is adjusted after the current detection point in accordance with the difference of peak values between polarities of the output current of the power converting circuit at the current detection point. In the case where the symmetry determining circuit determines that the output current is in the positive-negative asymmetrical state at the current detection point, the control circuit may increase the output current to the discharge lamp after the current detection point as an increase in the difference of peak values between polarities of the output current from the power converting circuit at the current detection point.

According to another aspect of the present invention, the control circuit calculates as needed during the filament heating operation a time integrated value of an amplitude of a current output to the discharge lamp. The control circuit then terminates the filament heating operation when the time integrated value reaches a predetermined upper limit value.

According to another aspect of the present invention, the control circuit causes the power converting circuit to stop outputting AC power after the time integrated value of the amplitude of the current output to the discharge lamp reaches the upper limit value and the filament heating operation is terminated. Electrical stress applied to a discharge lamp and circuit components can thereby be reduced.

According to another aspect of the present invention, the control circuit returns the process to the starting operation after the time integrated value of the amplitude of the current outputted to the discharge lamp reaches the upper limit value and the filament heating operation is terminated. Lamp starting ability can be improved in comparison with the previously described aspect of the present invention.

According to another aspect of the present invention, the control circuit returns the process to the starting operation after causing the power converting circuit to stop outputting AC power over a predetermined stop time, after the time integrated value of the amplitude of the current outputted to the discharge lamp reaches the upper limit value and the filament heating operation is terminated. Lamp starting ability can thereby be improved in comparison with previous aspects of the invention. Also, it is more difficult to have half-wave discharge (rectification) in the discharge lamp in the filament heating operation performed after returning to the starting operation in comparison with previous aspects.

According to another aspect of the present invention, the control circuit counts the number of times of returning from the filament heating operation to the starting operation, and causes the power converting circuit to stop outputting AC power, when the time integrated value of the amplitude of the current output to the discharge lamp reaches the upper limit value in the filament heating operation and after the number of times of restarting reaches the predetermined upper limit number of times. It is thereby made possible to prevent excessive electrical stress from being applied to the discharge lamp and the circuit components resulting from repeating the starting operation and the filament heating operation.

Another aspect of the present invention includes the various above-mentioned ballasts and a fixture main body for holding the ballast.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa. With regards to the discharge lamp of this application, "igniting," "starting," and "discharging" of the lamp may be considered synonymous unless otherwise stated.

According to the present invention, it is made possible to prevent excessive electrical stress from being applied to the discharge lamp and the circuit components resulting from unlimited repeating of the starting operation and the filament heating operation.

The present invention will now be further explained below with reference to the drawings.

Figure 1:
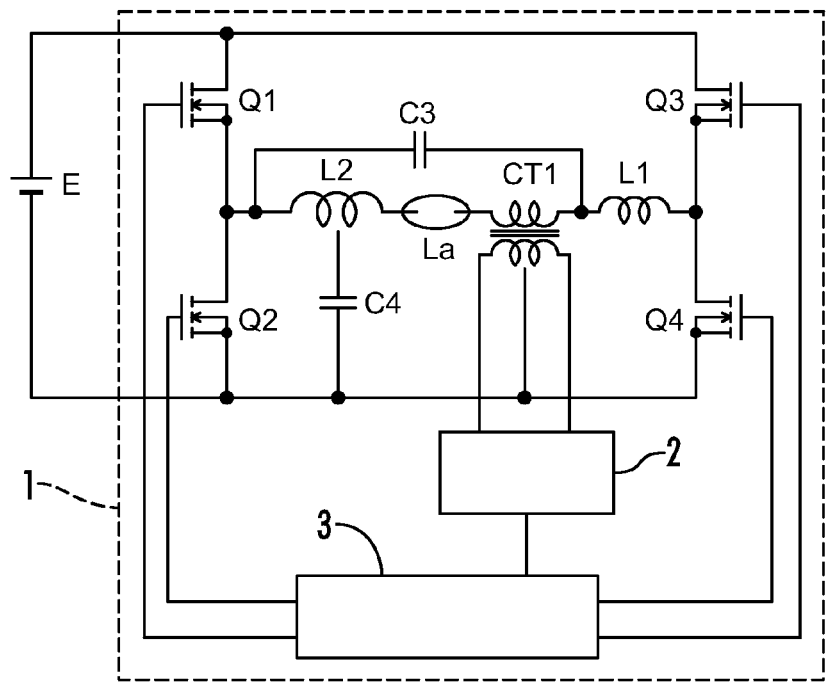
FIG. 1 is a circuit block diagram showing an embodiment of the electronic ballast according to the present invention.

As shown in FIG. 1, a ballast 1 according to an embodiment is provided to power a hot-cathode type discharge lamp La such as a high-pressure discharge lamp, also called an HID (high-intensity discharge lamp). The ballast 1 includes a power converting circuit for converting DC power inputted from a DC power source E into AC power, the power converting circuit here including a full bridge circuit including four switching elements Q1-Q4. A field effect transistor (FET) is used for the switching elements Q1-Q4 in the present embodiment.

One output terminal of the full bridge circuit, that is, a connection point between the switching elements Q3, Q4 forming one of two series circuits which include two of the switching elements Q1-Q4 and are connected between output terminals of the DC power source E in parallel with each other, is connected to one end (that is, one filament) of the discharge lamp La through a series circuit including a first inductor L1 and a primary winding of a current transformer CT1. The other output terminal of the full bridge circuit, that is, a connection point between the switching elements Q1, Q2 forming the other series circuit, is connected to the other end (that is, the other filament) of the discharge lamp La through a second inductor L2.

A first capacitor C3 is connected between the connection point of the switching elements Q1, Q2 and a connection point of the primary winding of the current transformer CT1 and the first inductor L1. The second inductor L2 is an autotransformer provided with a tap connected to ground through a capacitor C4. In other words, the first inductor L1, the first capacitor C3, the second inductor L2 and the second capacitor C4 along with the discharge lamp La constitute a resonant circuit connected between output terminals of the power converting circuit (the resonant circuit may alternatively be hereinafter referred to as a "load circuit").

The present embodiment further includes a symmetry determining circuit 2 which is connected to a secondary winding of the current transformer CT1 and determines whether or not a current Ila outputted to the discharge lamp La (referred to as a "lamp current" hereinafter) is in a positive-negative symmetrical state, and a control circuit 3 for on/off driving of each of the switching elements Q1-Q4.

Figure 2:
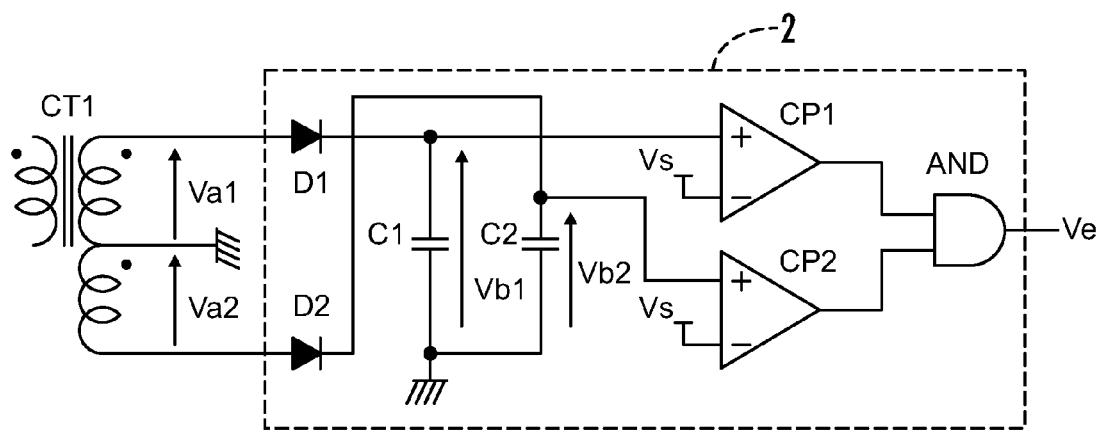
FIG. 2 is a circuit diagram showing a symmetry determining circuit in the embodiment of FIG. 1.

The symmetry detecting circuit 2, as shown in FIG. 2, includes two comparators CP1, CP2 each having a non-inverting input terminal connected to one end of the secondary winding of the current transformer CT1 through diodes D1, D2 and an inverting input terminal receiving a predetermined symmetry detecting voltage Vs. An AND circuit provides an AND output of the two comparators CP1, CP2 to the control circuit 3. A tap is provided in the center of the secondary winding of the current transformer CT1 and connected to ground. Connection points between the non-inverting input terminals of each of the comparators CP1, CP2 and the diodes D1, D2 are connected to ground through capacitors C1, C2, respectively. In other words, charging voltages Vb1, Vb2 across each of the capacitors C1, C2 are voltages corresponding to a peak value of output voltages Va1, Va2 of the diodes D1, D2, respectively, that is, a peak value of the lamp current Ila having a direction (polarity) corresponding to each of the capacitors C1, C2. The charging voltages Vb1, Vb2 are input to the non-inverting input terminals of each of the comparators CP1, CP2 corresponding to the capacitors C1, C2 respectively.

Figure 3A:
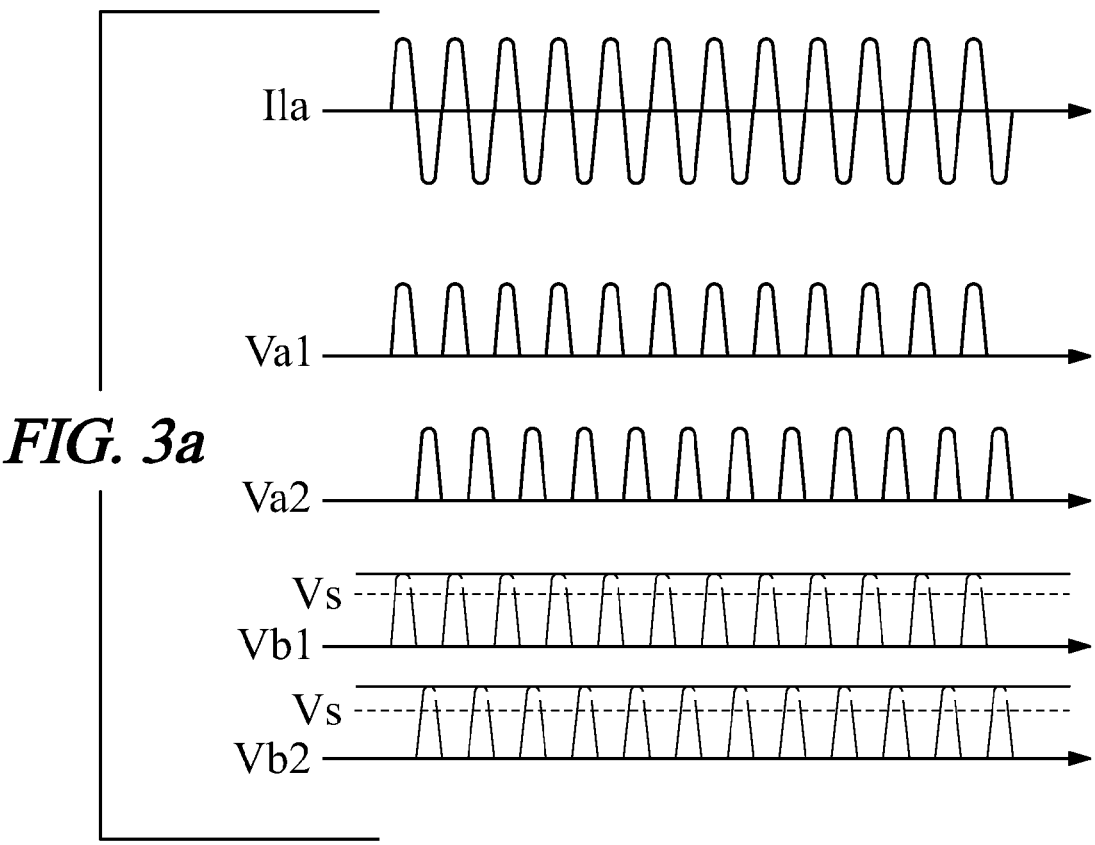
FIG. 3 is an explanatory diagram showing one example of operation in the symmetry determining circuit in the embodiment of FIG. 1, showing a symmetrical lamp current in FIG. 3(a) and an asymmetrical lamp current in FIG. 3(b).
Figure 3B:
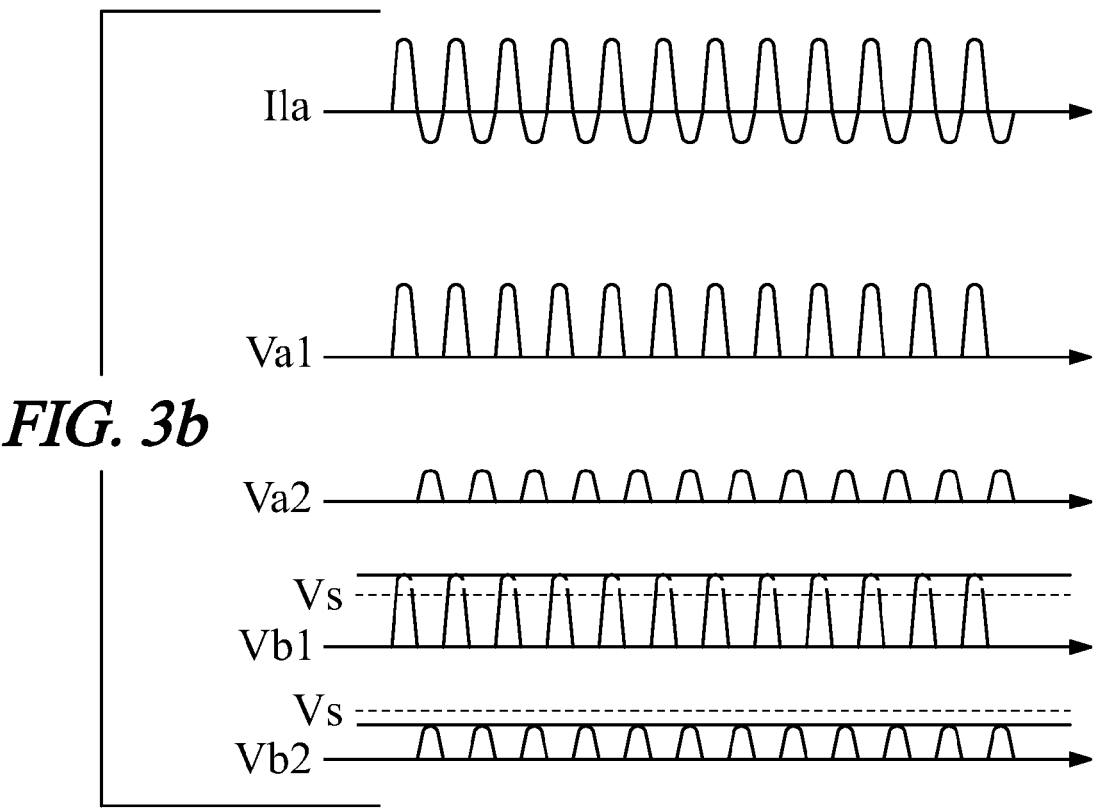

As shown in FIG. 3(a), in the case where the lamp current Ila is in a symmetrical state, both the charging voltages Vb1 and Vb2 of the respective capacitors C1 and C2 exceed the symmetry determining voltage Vs, whereby an output Ve of the AND circuit (i.e. output of the symmetry determining circuit 2, referred to as a "determining output" hereinafter) exhibits a HigHigh level. In contrast, in the case where the lamp current is in an asymmetrical state as shown in FIG. 3(b), the charging voltage Vb2 of the capacitor C2 falls below the symmetry determining voltage Vs, so that the determining output Ve results in a Low level. That is, the fact that the determining output Ve is in the High level means that power outputted to the discharge lamp La is determined to be symmetrical by the symmetry determining circuit 2, and, in contrary, the fact that the determining output Ve is in the Low level means that power outputted to the discharge lamp La is determined to be asymmetrical by the symmetry determining circuit 2.

Figure 4:
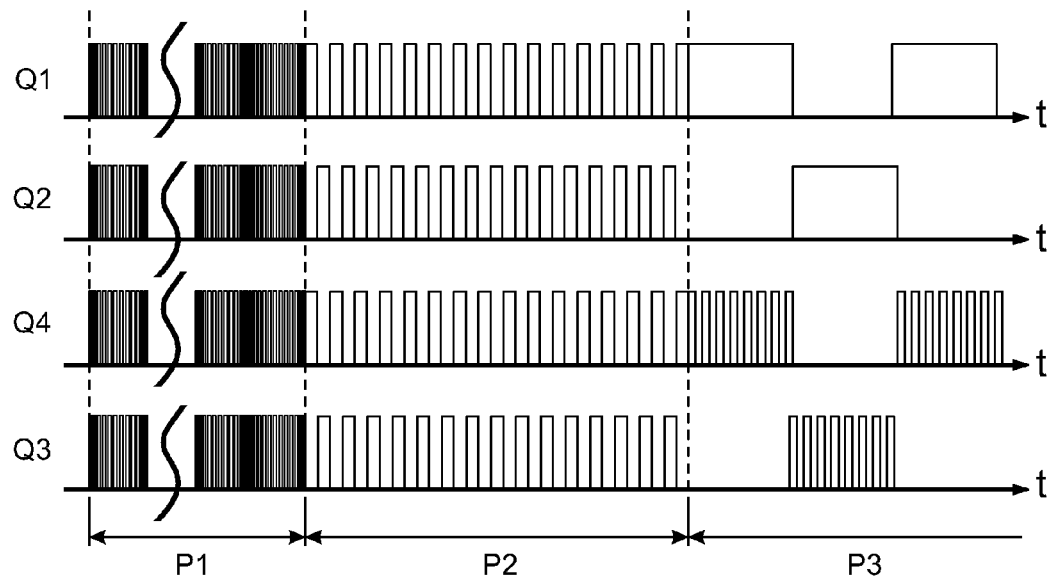
FIG. 4 is an explanatory diagram showing one example of a driving signal inputted from a control circuit to each of the switching elements in the embodiment of FIG. 1.

As shown in FIG. 4, the control circuit 3 drives on and off the switching elements Q1-Q4 so that the diagonally positioned switching elements Q1, Q4 and Q2, Q3 are simultaneously turned on while the serially-connected switching elements Q1, Q2 and Q3, Q4 are alternately turned on and off. Accordingly, DC power provided from the DC power source E is converted into AC power and a frequency of the AC power becomes a frequency of polarity inversion caused by driving on and off of the switching elements (hereinafter referred to as "operating frequency").

Figure 5:
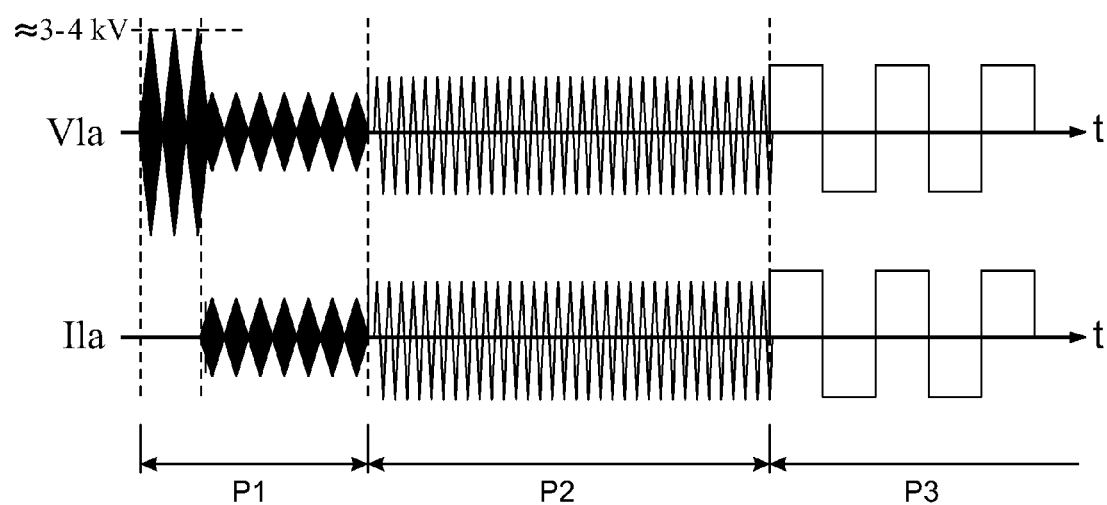
FIG. 5 is an explanatory diagram showing an example of operation in the embodiment of FIG. 1.

Operation of the control circuit 3 of various embodiments such as shown in FIG. 1 will be described in more detail below with further reference to FIGS. 4-6. FIG. 4 shows a driving signal input to each of the switching elements Q1-Q4, more specifically, a voltage applied between a gate and a source for each of the switching elements Q1-Q4. Each of the switching elements Q1-Q4 are turned on in a period during which the driving signal is at the High level and turned off in a period during which the driving signal is at the Low level, respectively.

Figure 6:
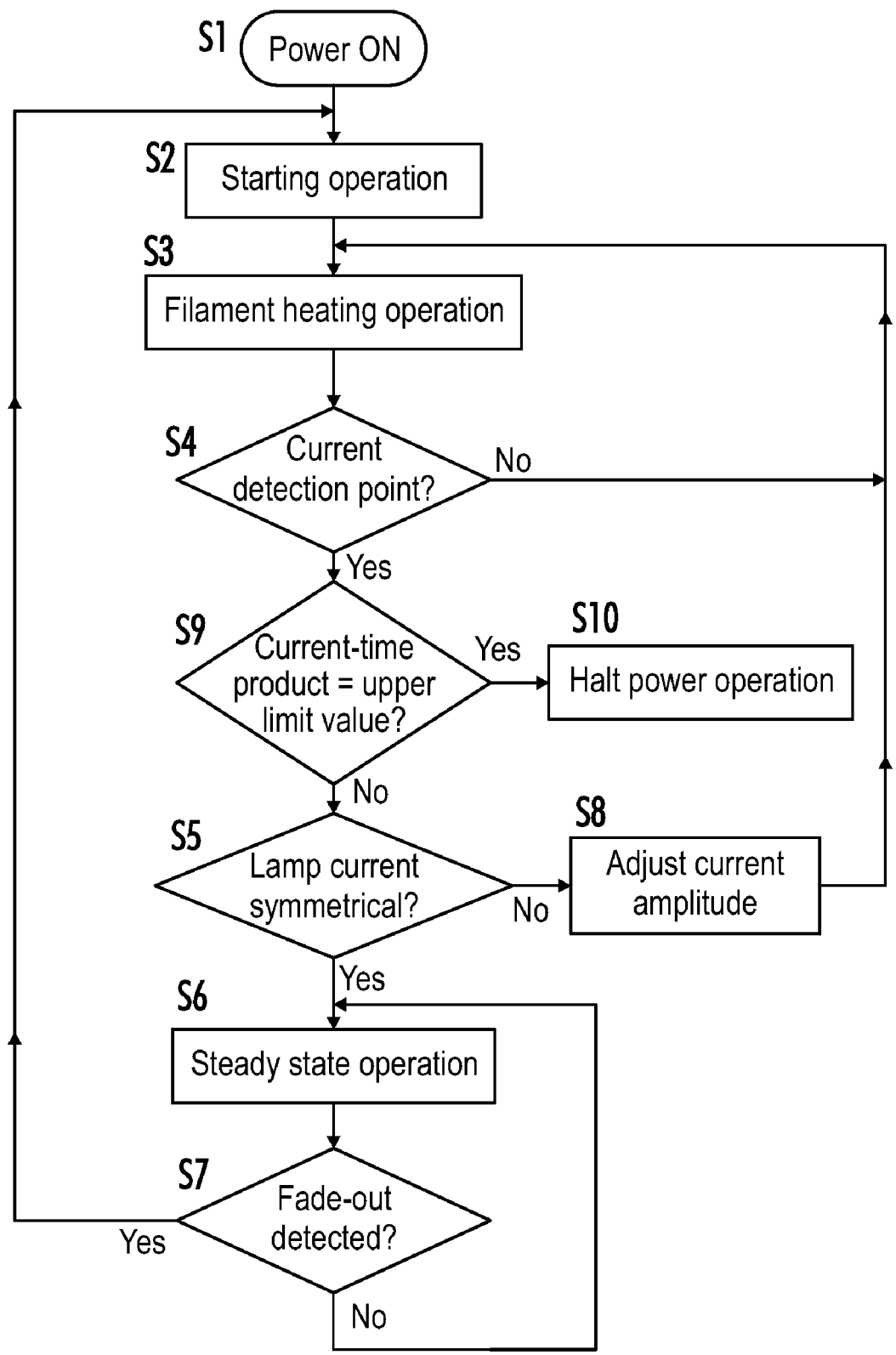
FIG. 6 is a flowchart showing an example of operation in the embodiment of FIG. 1.

Referring now to FIG. 6, when power is on (S1), the control circuit 3 begins a starting operation for starting discharge in the discharge lamp La (S2). In a starting period P1 during which the starting operation is performed, the control circuit 3 periodically varies the operating frequency in a range of a few dozens of kHz using the operating frequency of a few hundreds kHz. In the starting period P1, the operating frequency becomes a resonant frequency (or very near resonant frequency) of a resonant circuit including a primary winding portion of the second inductor L2 as an auto transformer, that is, a site between the connection point of the switching elements Q1, Q2 and the tap and the second capacitor C4. A resonant voltage generated at this time is increased by the second inductor L2 as the auto transformer, resulting in that a voltage output to the discharge lamp La (hereinafter referred to as "lamp voltage") V1a reaches a voltage necessary for starting, that is, discharge (for example, 3 to 4 kV) and the discharge lamp La is started.

The second inductor L2 and the second capacitor C4 may be thus described as constituting a starting circuit. In an example shown in FIG. 5, in a third cycle of the period variation in the operating frequency, the discharge lamp La is started, the lamp current I1a begins to flow, and an amplitude of the lamp voltage V1a is lowered due to variation in impedance which is caused by starting of the discharge lamp La.

After the above-mentioned starting operation has continued for a predetermined time period, the control circuit 3 finishes the starting operation. The starting period P1 proceeds to an filament heating period P2 during which a filament heating operation reduces the operating frequency (for example, a few dozens of kHz) to be less than the operating frequency in the starting operation (S3). The operating frequency in the filament heating operation is a relatively high frequency, which is closer to a resonant frequency of the load circuit than the operating frequency in a steady-state operation as described later to heat each filament of the discharge lamp La.

Figure 7:
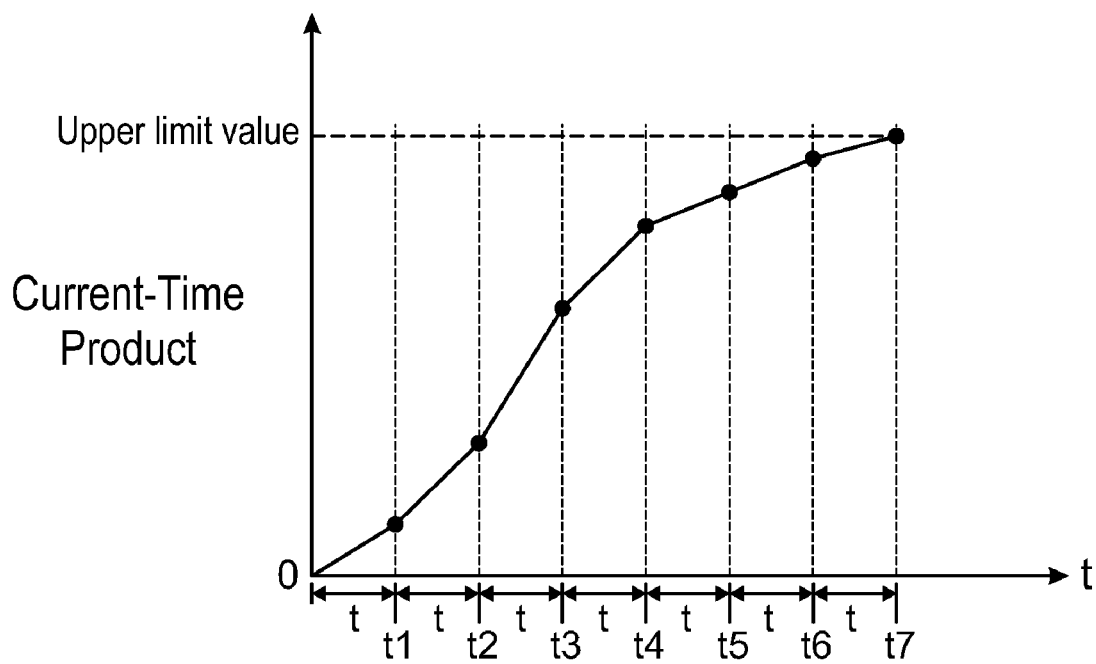
FIG. 7 is an explanatory diagram showing an example of a filament heating operation in the embodiment of FIG. 1.

During the filament heating period P2, the control circuit 3 maintains power supplied to the discharge lamp La up to predetermined time intervals at which the lamp current I1a should be detected (referred to as "current detection point" hereinafter) (NO in S4). More specifically, current detections are performed at predetermined intervals of detection time t as shown in FIG. 7. Then, at a current detection point (YES in S4), reference is made to the determination by the symmetry determining circuit 2 (step S5), and if the symmetry determining circuit 2 determines the lamp current I1a is in a symmetrical state (i.e. the determining output Ve in the High level, YES in S5), the filament heating operation is terminated and operation of the ballast is allowed to proceed to the steady state operation (S6).

In a steady-state period P3 during which the steady-state operation is performed, the control circuit 3 makes the operating frequency in the steady-state operation smaller than the operating frequency in the filament heating operation (for example, a few hundreds of kHz), thereby feeding rectangular wave AC power for maintaining lighting of the discharge lamp La to the discharge lamp La. In the steady-state operation, the control circuit 3 also performs a PWM control adjustment of power fed to the discharge lamp La by turning on/off the switching elements Q3, Q4 of one series circuit at a predetermined duty ratio without turning on at all times in the period during which the diagonally-located switching elements Q1, Q2 are turned on. In other words switching element Q3 is not turned on while switching elements Q1 or Q4 are turned on, and switching element Q4 is not turned on while switching elements Q2 or Q3 are turned on. Furthermore, in the steady-state operation, the control circuit 3 detects fade-out of the discharge lamp La based on, for example, the lamp current I1a (S7), and if the fade out is detected (YES in S7), the steady state operation is terminated and the control circuit returns to the starting operation in step S2.

Moreover, if the symmetry determining circuit 2 determines that the lamp current I1a is in an asymmetrical state in step S5 (i.e. the determining output Ve in the Low level, NO in S5), the amplitude of the lamp current I1a (referred to as a "current amplitude" hereinafter) is changed (S8), followed by returning to step S3 to continue the filament heating operation. Changing the current amplitude in the above step S8 is realized by for example adjusting an operating frequency, and the current amplitude in this step is increased to be larger than the current amplitude at least upon starting the filament heating operation. More specifically, the control circuit 3 makes the current amplitude larger in association with an increase in the asymmetrical current value $\Delta$I1a as shown in FIG. 8 by obtaining an absolute value of the difference of the amplitude (or peak height) between positive and negative polarities in the lamp current I1a (referred to as an "asymmetrical current value" hereinafter) from the symmetry detection circuit 2.

Figure 8:
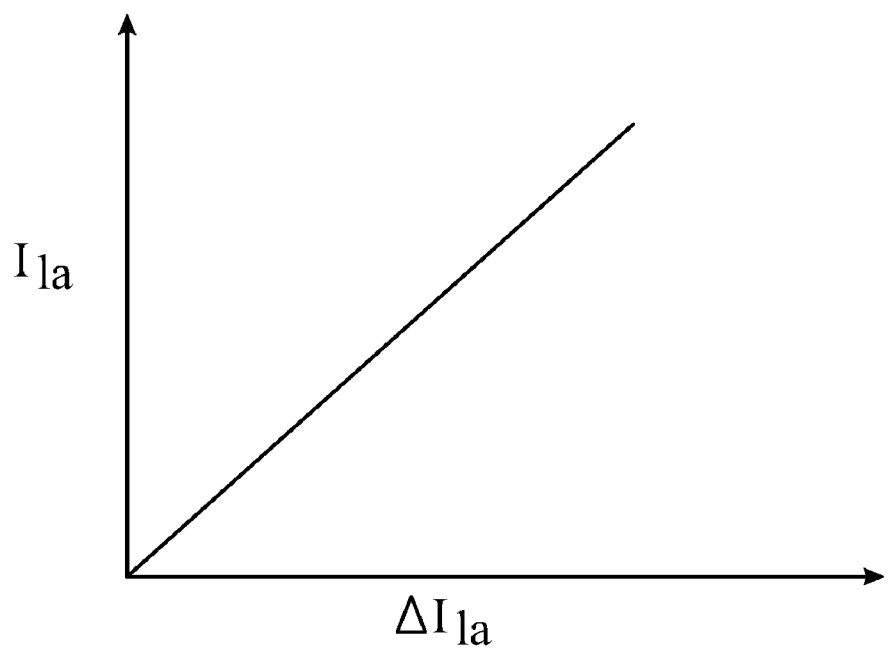
FIG. 8 is an explanatory diagram showing an example of a relationship between an asymmetrical current value and a current amplitude in the embodiment of FIG. 1.

Although the current amplitude is increased linearly with respect to the asymmetrical current value $\Delta$I1a in FIG. 8, the current amplitude may have an upper limit value I1a_max. More specifically, the current amplitude value may be maintained at an upper limit value I1a_max when an asymmetrical current value $\Delta$I1a is larger than a fixed value and even if the asymmetrical current value $\Delta$I1a is increased to exceed the fixed value in any ranges. In this case, the graph in FIG. 8 is provided in a polygonal graph form. The upper limit value I1a_max of the current amplitude is established so that, for example, an effective value of the lamp current I1a corresponds to a value equal to or less than double of a rated current value of the discharge lamp La which may presumably be used.

The control circuit 3 further calculates a time integrated value of the current amplitude (referred to as a "current-time product" hereinafter), as needed during the filament heating operation. The control circuit 3 also determines whether or not the current-time product has reached a predetermined upper limit value at a current detection point (S9). In the case where the current-time product does not reach the upper limit value, the filament heating operation is continued, while in the case where the current-time product has reached the upper limit value, the filament heating operation is halted to stop power supply to the discharge lamp La by, for example, turning off each of the switching elements Q1-Q4 in the full bridge circuit (S10). That is, the filament heating operation is continued while adjusting the current amplitude in accordance with an asymmetrical current value at intervals of the detection time t until the lamp current Ila is determined to be symmetrical in step S5 or until a current-time product reaches an upper limit value in step S9. In the example of FIG. 7, power supply to the discharge lamp La is halted resulting from the fact that a current-time product has reached an upper limit value at seventh current detection point t7.

According to the above embodiment, an appropriate time to terminate the filament heating operation is set to a point at which the lamp current Ila is determined to be symmetrical by the symmetry determining circuit 2, whereby the amount of power supplied to the discharge lamp La during the filament heating operation can be adjusted appropriately without making the power excessively large while preventing the lamp from fade-out after proceeding to the steady state operation.

An asymmetrical current, that is, half-wave discharge in the discharge lamp is considered to occur due to unstable discharge of electrons observed when the temperature of filaments of the discharge lamp is too low. In the present embodiment, the current amplitude is increased at least once if the lamp current Ila is determined to be asymmetric by the symmetry determining circuit 2, thereby making it easier to raise the temperature of the filaments of the discharge lamp La in comparison with the case of not increasing the current amplitude, so that proceeding to the steady state operation can be realized in a shorter period of time.

Furthermore, power to the discharge lamp La is removed if a current-time product has reached an upper limit value in step S9, whereby the electrical stress applied to the discharge lamp La and the circuit components can be reduced in comparison with the case in which the filament heating operation is continued without limitation.

Although the current amplitude is changed at every current detection point in the above example, the current amplitude may be changed only once at first current detection point t1. In this case, the graph shown in FIG. 7 will be linearly extended at the time of the first current amplitude change t1 and thereafter. This case may be further realized by setting the changed current amplitude constant regardless of an asymmetrical current value. Also shown in the example of FIG. 7 is that a period of time from the start of the filament heating operation to the first current detection point t1 is the same as the period of time set for the intervals of the following current detection point (detection time t), but the period of time from the start of the filament heating operation to the first current detection point t1 may also be set differently from the period of time set for the intervals of the following current detection points (t2 . . . tn).

Figure 9:
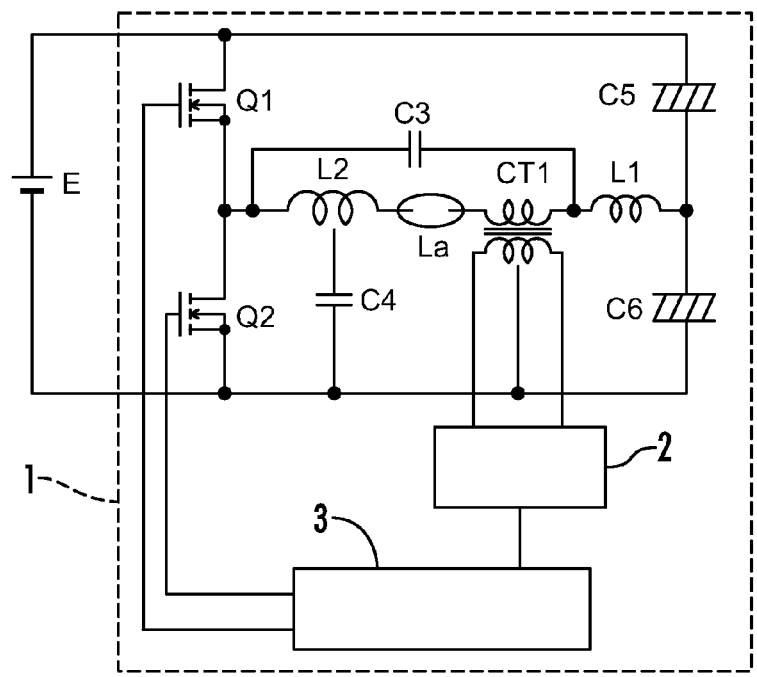
FIG. 9 is a circuit block diagram showing another embodiment of the present invention.
Figure 10:
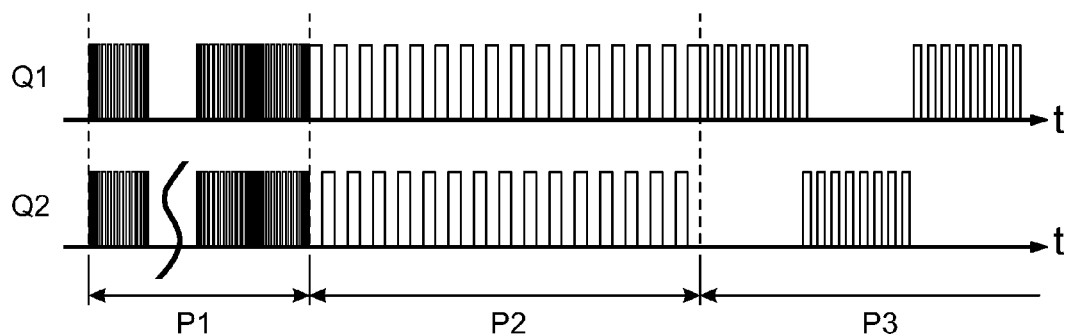
FIG. 10 is an explanatory diagram showing an example of a driving signal input from a control circuit to each of the switching elements in the embodiment of FIG. 9.

In alternative embodiments of the present invention as shown in FIG. 9, a half bridge circuit is obtained by replacing each of the switching elements Q3, Q4 forming one series circuit with capacitors C5, C6, respectively, and may be adopted in place of the full bridge circuit as shown in FIG. 1. In this case, as shown in FIG. 10, driving on and off of the two switching elements Q1, Q2 serially-connected with each other is performed in the starting period P1 and the filament heating period P2 as in the example shown in FIG. 1. However, in the steady-state period P3, a PWM control adjusts the power output to the discharge lamp La at the duty ratio of the switching elements Q1, Q2 to be turned on in the polarity non-inverting period.

Figure 11:
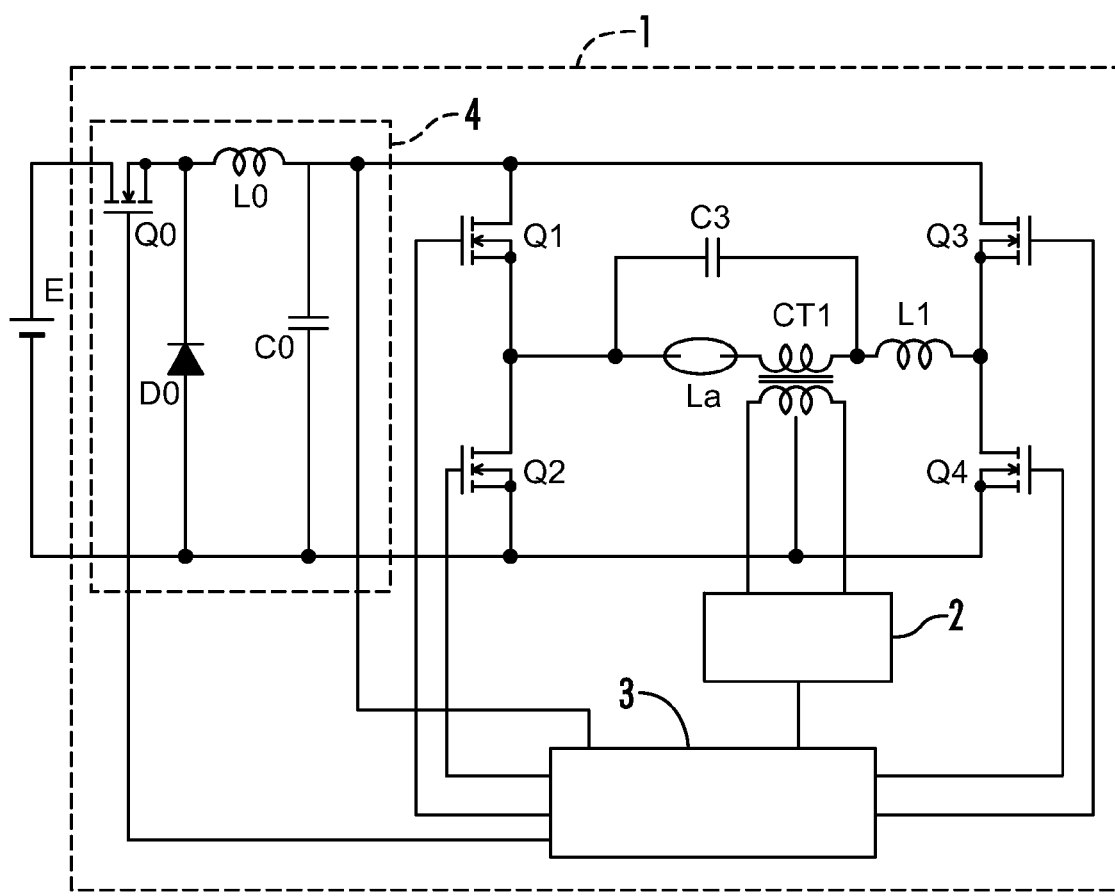
FIG. 11 is a circuit block diagram showing another embodiment of the present invention.

Referring now to FIG. 11, in an embodiment the ballast 1 may include a step-down chopper circuit 4 for lowering the output voltage of the DC power source E and outputting the voltage to the full bridge circuit. In this case, the power converting circuit includes a full bridge circuit, including four switching elements Q1-Q4, and the step-down chopper circuit 4. In an example as shown in FIG. 11, the step-down chopper circuit 4 includes: a switching element Q0 having one terminal connected to a high voltage-side output terminal of the DC power source E and another terminal connected to the input terminal of the full bridge circuit through an inductor L0; a diode D0 having a cathode connected to a connection point of the switching element Q0 and the inductor L0 and an anode connected to ground; and a capacitor C0 connected between the input terminals of the full bridge circuit, that is, the output terminals of the step-down chopper circuit 4.

Figure 12:
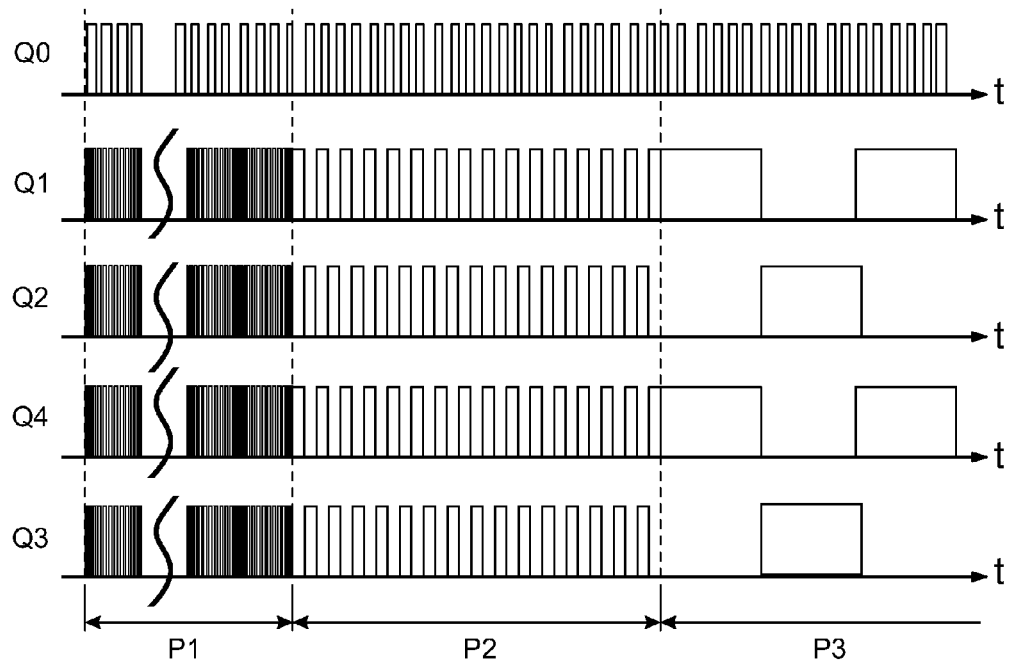
FIG. 12 is an explanatory diagram showing an example of the driving signal input from the control circuit to each of the switching elements in the embodiment of FIG. 11.

In the embodiment shown in FIG. 11, the second inductor L2 and the second capacitor C4 are omitted from the load circuit and, in the starting operation, a high starting voltage is output to the discharge lamp La due to resonance of the resonant circuit including the first capacitor C3 and the first inductor L1. In other words, the first capacitor C3 and the first inductor L1 form the starting circuit. Furthermore, as shown in FIG. 12, because the control circuit 3 controls power fed to the discharge lamp La at the duty ratio of the switching element Q0 of the step-down chopper circuit 4, PWM control by turning on/off the switching elements Q1-Q4 of the full bridge circuit is not performed even in the steady-state period P3.

Figure 13:
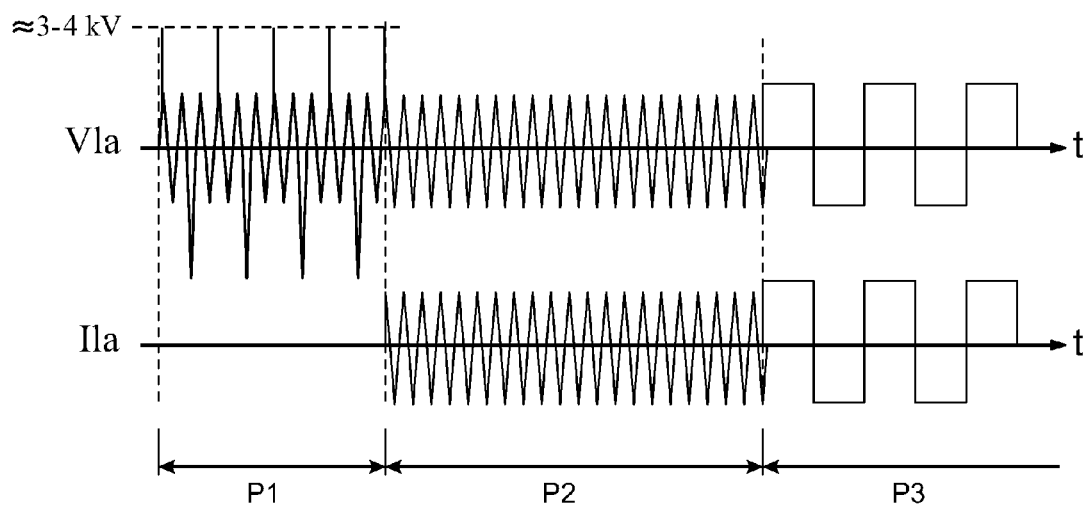
FIG. 13 is an explanatory diagram showing operation in yet another embodiment according to the present invention.

Alternatively, as shown in FIG. 13, a pulse generating circuit (not shown) may be provided as a starting circuit for generating a high voltage pulse to start the discharge lamp La in the starting operation. In this case, the operating frequency in the starting operation can be the same as the operating frequency in the filament heating operation. Because the above-mentioned pulse generating circuit can be achieved in accordance with various previously described configurations of the present invention, further illustration and detailed description thereof are omitted.

Figure 14:
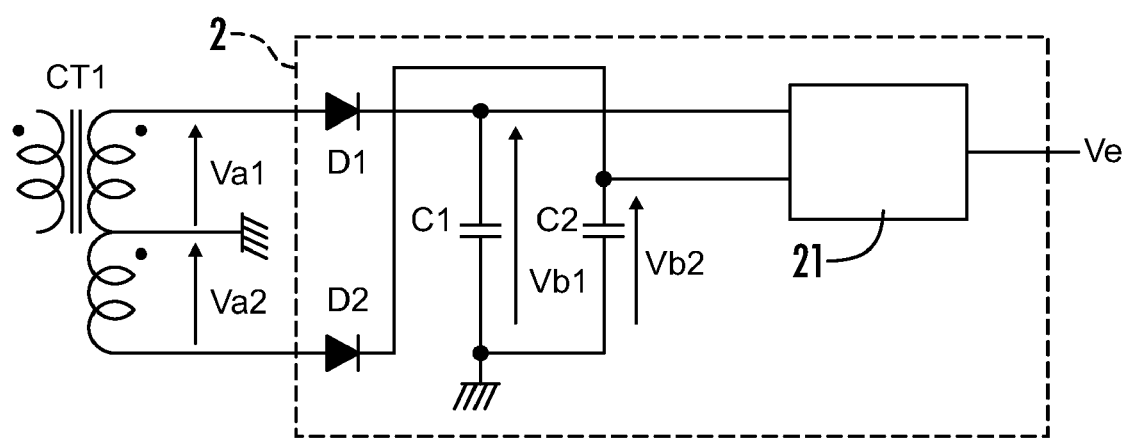
FIG. 14 is a circuit diagram showing an example of the symmetry determining circuit according to various embodiments of the present invention.

The symmetry determining circuit 2 is not limited to the embodiment as shown in FIG. 2 and may be as alternatively shown in FIG. 14, for example. The symmetry determining circuit 2 in FIG. 14 includes a calculating module 21 for calculating an absolute value |Vb1-Vb2| of a difference between input charging voltages Vb1, Vb2 of the capacitors C1, C2 and further for comparing the absolute value with a predetermined symmetry threshold, in place of the comparators CP1, CP2. When the absolute value |Vb1−Vb2| is less than the symmetry threshold, the calculating module 21 determines that the lamp current I1*a* is in a symmetrical state and sets the output to the control circuit 3 (symmetry determining output) Ve to the High level. When the absolute value |Vb1−Vb2| is equal to or greater than the symmetry threshold, the calculating module 21 determines that the lamp current I1*a* is in the asymmetrical state and sets the symmetry determining output Ve to the Low level.

Figure 15:
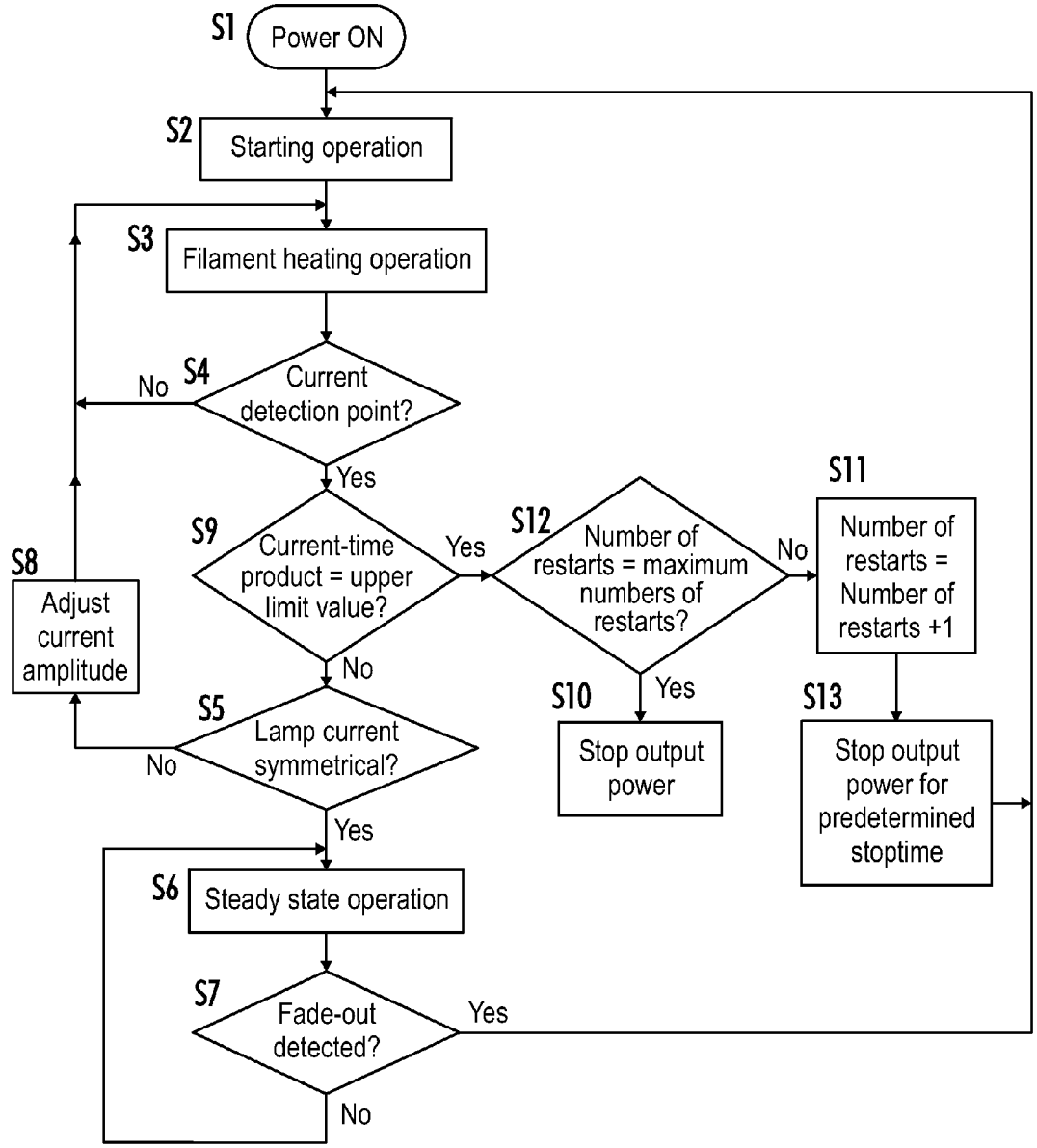
FIG. 15 is a flowchart showing an example of operation according to various embodiments of the present invention.

In addition, an operation performed when the current-time product has reached an upper limit value (i.e. YES in step S9) may also be realized by returning to the starting operation in step S2 as shown in FIG. 15 rather than instantly stopping power supply to the discharge lamp La as shown in FIG. 6. This configuration will improvement starting ability in comparison with the example of FIG. 6.

Further performed in the example of FIG. 15 is counting the number of times of returning from the filament heating operation to the starting operation (referred to as a "number of times of restarting" hereinafter) in step S11 and comparing it to a predetermined upper limit number of restarts in step S12. Power supply to the discharge lamp La is stopped by proceeding to step S10 without returning to step S2 if the number of times of restarting has reached the upper limit number of restarts. That is, the process does not return to the starting operation more than the upper limit number of times, whereby making it possible to prevent an electrical stress from unnecessarily being applied to the circuit components by repeating the above loop without limitation.

In the example of FIG. 15, the control circuit 3 further stops power supply to the discharge lamp La by, for example, turning off each of the switching elements Q1-Q4 over a predetermined period of time before returning to step S2 (S13). Therefore, in comparison with the case of instantly returning to step S2 without arranging step S13, even if, for example one of the filaments exhibits a higher temperature than the other filament in the discharge lamp La, the potential for a half-wave discharge in a subsequent filament heating operation is reduced by realizing a smaller temperature difference between the filaments resulting from temperature reduction in each of the filaments in a delay period prior to beginning the starting operation again.

Figure 16:
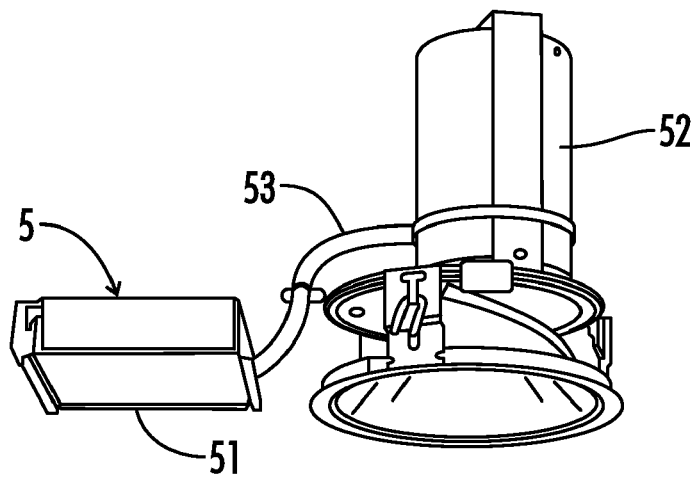
FIG. 16 is a perspective view showing an illumination fixture using an embodiment of the ballast of the present invention.
Figure 17:
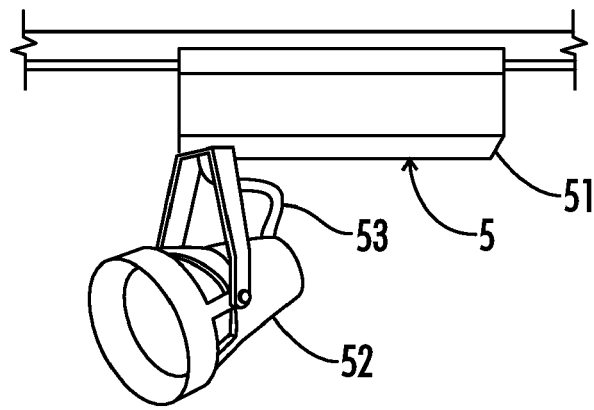
FIG. 17 is a perspective view showing another example of the illumination fixture using an embodiment of the present invention.
Figure 18:
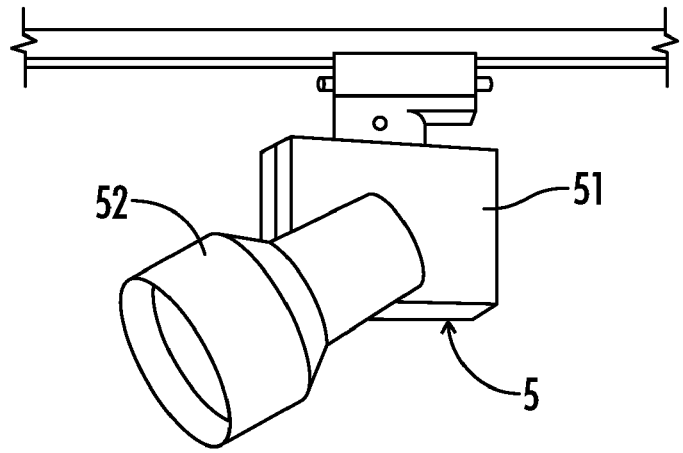
FIG. 18 is a perspective view showing yet another example of the illumination fixture using an embodiment of the present invention.
Figure 19A:
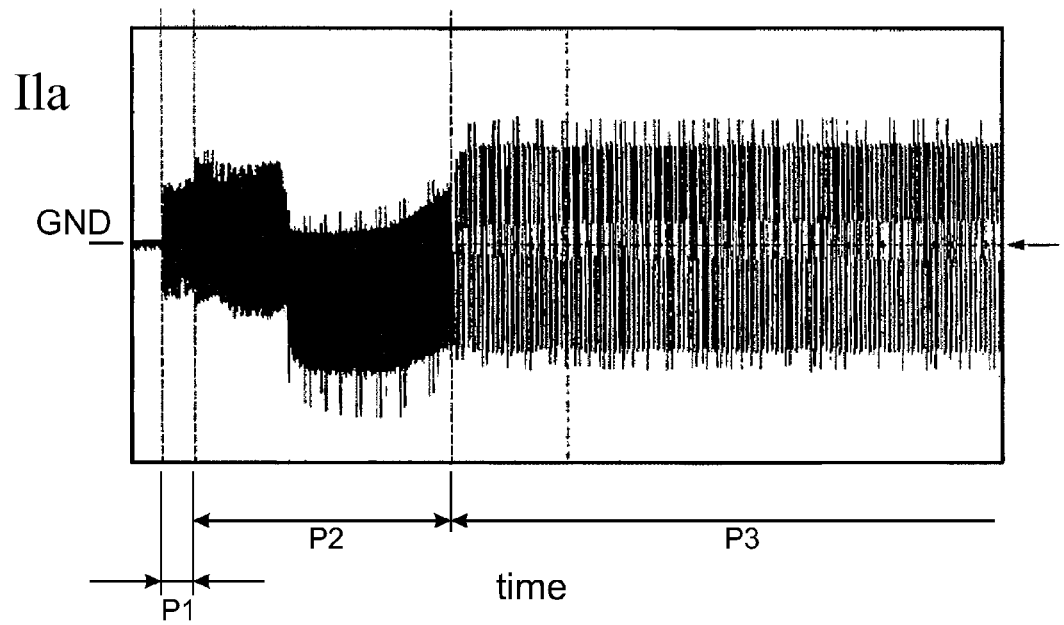
FIGS. 19a and 19b are explanatory diagrams of examples of a waveform in a lamp current, showing a case of insufficient duration time of the filament heating operation in FIG. 19(a) and a case of having sufficiently long duration time of the filament heating operation in FIG. 19(b).
Figure 19B:
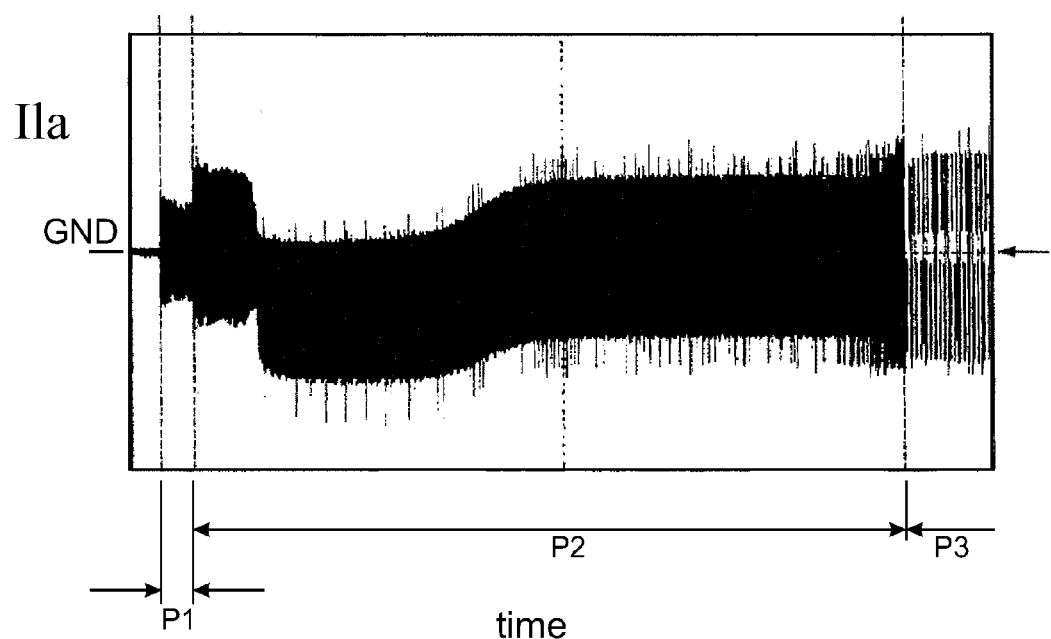

The aforementioned ballast embodiments can be used for, for example, in each of the lighting fixtures 5 as shown in FIGS. 16 to 18. Each of the lighting fixtures 5 shown in FIGS. 16 to 18 includes a fixture main body 51 for storing the ballast 1, and a lamp body 52 for holding the discharge lamp La. Each of the lighting fixtures 5 shown in FIGS. 16 and 17 also includes a power supply line 53 for electrically connecting the ballast 1 and the discharge lamp La.

Thus, although there have been described particular embodiments of the present invention of a new and useful Electronic Ballast with Adjustable Filament Preheating Based on Output Current Symmetry it is not intended that such references be construed as limitations upon the scope of this invention except as set forth in the following claims.

What is claimed is:

1. An electronic ballast comprising:
   a power converting circuit for receiving DC power and outputting AC power at output ends;
   a starting circuit connected between the output ends of the power converting circuit, and configured to generate a high voltage for starting a discharge lamp;
   a control circuit configured for controlling the power converting circuit to generate AC power output to the lamp; and
   a symmetry determining circuit configured to determine a positive-negative symmetrical state of the AC power output to the lamp with respect to ground;
   the control circuit further configured to
      after startup of the discharge lamp, enter a filament heating operation in which the output frequency of the power converting circuit is controlled to a first frequency,
      at one or more predetermined current detection points during the filament heating operation, obtain the symmetrical state from the symmetry determining circuit,
      end the frequency heating operation and enter a steady state operation when the symmetry determining circuit determines that the output current is in a symmetrical state at the current detection point, the steady state operation comprising an output frequency of the power converting circuit controlled to a second frequency for maintaining the lighting of the discharge lamp, and
      increase the output current to the lamp and continue the frequency heating operation when the symmetry determining circuit determines that the output current is in an asymmetrical state at the current detection point; and
   wherein the symmetry determining circuit is configured to
      detect a positive peak signal and a negative peak signal provided to the lamp with respect to ground,
      compare the peak signals to a symmetry reference voltage,
         determine the output power provided to the lamp to be in a symmetrical state when both of the positive and negative peak signals exceed the symmetry reference voltage, and
         determine the output power provided to the lamp to be in an asymmetrical state when at least one of the positive and negative peak signals do not exceed the symmetry reference voltage.

2. The ballast of claim 1, wherein the control circuit is configured to
   increase the output current to the lamp based upon a determination of the symmetry determining circuit at a first current detection point that the output current is in the asymmetrical state, and
   after the first current detection point to maintain the output current to the lamp to be constant until the filament heating operation is finished.

3. The ballast of claim 2, wherein the control circuit is configured to
   determine and adjust an increase in the output current to the lamp in accordance with a difference between peak values of polarities of an output current of the power converting circuit detected at the first current detection point.

4. The ballast of claim 1, wherein the control circuit is configured to
   in the case where the symmetry determining circuit determines that the output current is in the positive-negative asymmetrical state at the current detection point, determine an output current to the discharge lamp after the current detection point in accordance with the difference between the peak values of the polarities of the output current of the power converting circuit at the current detection point.

5. The ballast of claim 4, the control circuit configured to increase the output current to the discharge lamp after the current detection point in accordance with the difference between the peak values of polarities of the output current from the power converting circuit at the current detection point.

6. The ballast of claim 5, the control circuit configured to calculates as needed during the filament heating operation a time integrated value of an amplitude of the output current to the discharge lamp, and
finish the filament heating operation when the time integrated value reaches a predetermined upper limit value.

7. The ballast of claim 6, the control circuit configured to cause the power converting circuit to stop outputting AC power after a time integrated value of the amplitude of the current output to the discharge lamp reaches the upper limit value and the filament heating operation is finished.

8. The ballast of claim 6, the control circuit configured to return the process to a starting operation after the time integrated value of the amplitude of the current output to the discharge lamp reaches the upper limit value and the filament heating operation is finished.

9. The ballast of claim 8, the control circuit configured to cause the power converting circuit to stop outputting AC power for a predetermined stop time, after a time integrated value of the amplitude of the current output to the discharge lamp reaches the upper limit value and the filament heating operation is finished, and return the process to the starting operation after lapse of the predetermined stop time for restarting the lamp.

10. The ballast of claim 9, the control circuit configured to count the number of restarts, and
cause the power converting circuit to stop outputting AC power when the time integrated value of the amplitude of the current output to the discharge lamp reaches the upper limit value in the filament heating operation after the number of restarts reaches a predetermined upper limit number of restarts.

11. An electronic ballast comprising:
a power converting circuit coupled to receive an input voltage, the power converting circuit further comprising a plurality of switching elements for converting the input voltage to an output voltage for powering a discharge lamp;
a current transformer having a primary winding coupled in series with the lamp and a secondary winding with a center tap coupled to ground;
a symmetry determining circuit having a first capacitor coupled to a first end of a secondary winding of the current transformer and a second capacitor coupled to a second end of the secondary winding, the symmetry detecting circuit configured to compare voltages across the capacitors with a predetermined threshold value and provide a symmetry detecting output dependent on the comparison; and
a control circuit coupled to the plurality of switching elements and configured to control the output voltage of the power converting circuit by controlling an on-time for at least one switching element,
wherein an output voltage of a first frequency is provided from the power converting circuit to heat a filament of the lamp after startup of the lamp,
wherein a time integrated value of an amplitude of a current across the lamp is measured during filament heating and power supply to the lamp is halted when said time integrated value exceeds a predetermined upper limit value, and
wherein the output voltage from the power converting circuit is shifted to a second lower frequency based at least in part on the symmetry determining output.

12. The ballast of claim 11, the symmetry determining circuit further configured to provide a first symmetry determining output where the voltages across both capacitors are greater than the threshold or a second symmetry determining output where a voltage across either capacitor is less than the threshold.

13. The ballast of claim 12, the control circuit configured to shift from the first frequency for heating the electrodes to the second lower frequency upon receiving a first symmetry determining output from the symmetry determining circuit.

* * * * *